US006530138B2

(12) United States Patent
Phillips

(10) Patent No.: US 6,530,138 B2
(45) Date of Patent: Mar. 11, 2003

(54) METHOD FOR MANUFACTURING A GEAR REDUCER

(75) Inventor: Allyn E. Phillips, Salem, SC (US)

(73) Assignee: Reliance Electric Technologies, LLC., Mayfield Heights, OH (US)

( * ) Notice: Subject to any disclaimer, the term of this patent is extended or adjusted under 35 U.S.C. 154(b) by 0 days.

(21) Appl. No.: 09/816,302

(22) Filed: Mar. 23, 2001

(65) Prior Publication Data

US 2001/0011488 A1 Aug. 9, 2001

Related U.S. Application Data

(63) Continuation of application No. 09/410,141, filed on Sep. 30, 1999, now Pat. No. 6,253,640.

(51) Int. Cl.[7] .............................................. B23P 13/04
(52) U.S. Cl. ..................... 29/527.6; 29/558; 74/606 R; 408/1 R
(58) Field of Search ............................... 29/527.6, 557, 29/558; 74/606 R; 408/1 R

(56) References Cited

U.S. PATENT DOCUMENTS 5,509,329 A * 4/1996 Jackson et al. ........... 74/606 R
6,053,838 A * 4/2000 Gage ........................ 74/606 R

* cited by examiner

Primary Examiner—P. W. Echols
(74) Attorney, Agent, or Firm—Patrick S. Yoder; Alexander M. Gerasimow; William R. Walbrun

(57) ABSTRACT

A gear reducer housing includes rotating assembly supports in a housing shell, and fixturing pads disposed about the periphery of the housing shell. The fixturing supports are formed in the casting blank from which the housing shell is machined. The pads permit the shell blank to be fixtured once for machining of various features of the final shell. The pads may be formed in a peripheral flange and the flange may be machined around the pads to form a sealing surface. Apertures may be provided in the flange to facilitate assembly of the gear reducer. The apertures and fixturing pads may be provided in mirror image locations about a centerline of the housing. The apertures may be slotted, with major axes of mirror image-located apertures having transverse major axes, such that inherent tolerance is provided for positioning fasteners used to assemble the product.

37 Claims, 7 Drawing Sheets

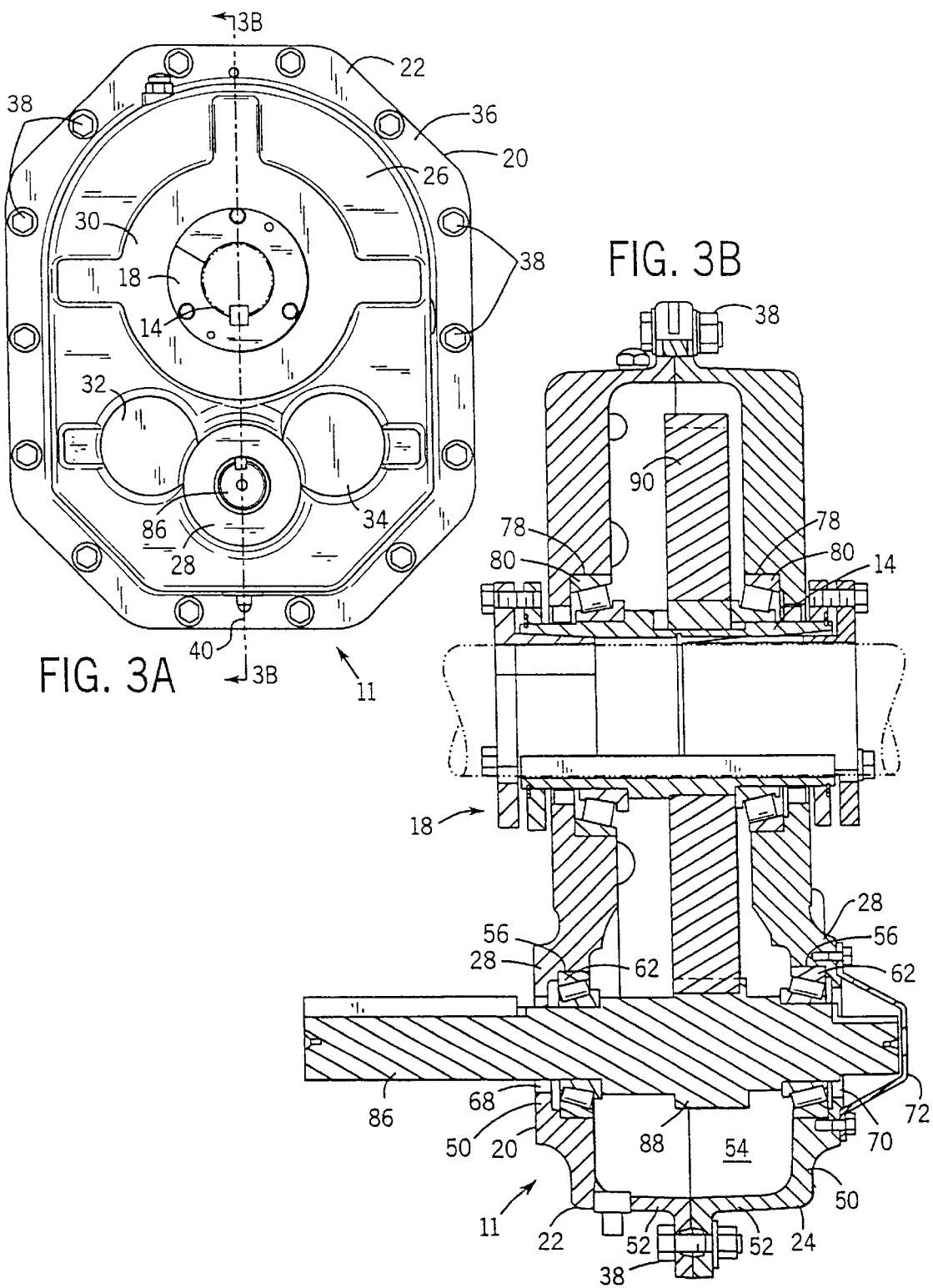

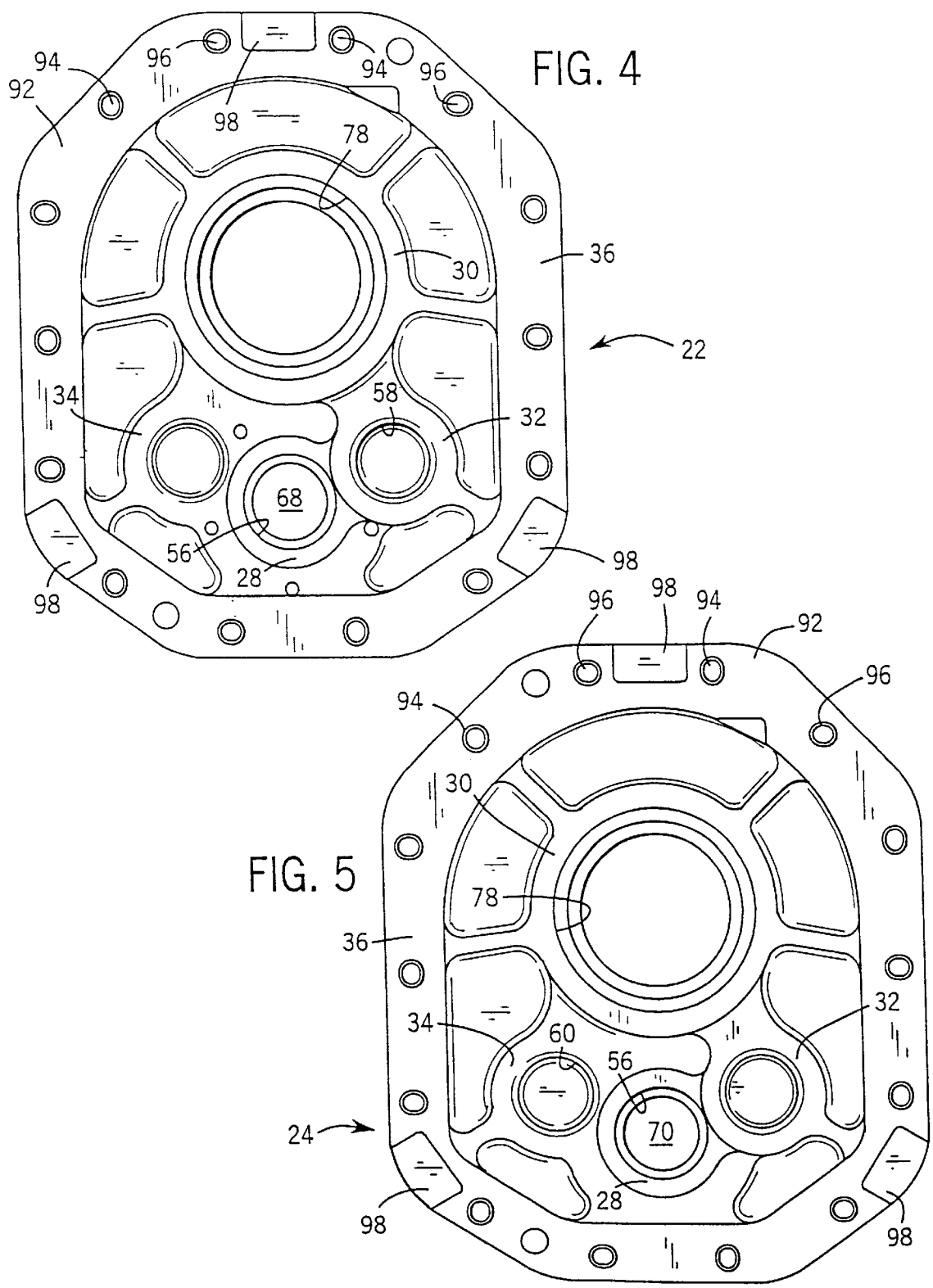

METHOD FOR MANUFACTURING A GEAR REDUCER

This application is a Continuation of application Ser. No. 09/410,141 filed Sep. 30, 1999 now U.S. Pat. No. 6,253,640.

BACKGROUND OF THE INVENTION

1. Field of the Invention

The present invention relates generally to the field of gear reducers, such as machines designed with one or multiple reduction stages within a support housing. More particularly, the invention relates to novel features of a gear reducer support housing which facilitate its manufacture and assembly in the final gear reducer product.

2. Description of the Related Art

Gear reducers of various types are ubiquitous in the field of industrial mechanical power transmission. Such gear reducers are typically employed to reduce the speed of a rotational input shaft to a desired level, and to, consequently, increase the torque applied to a load. Many different designs for such products have been proposed and are presently in use. In one particular type of gear reducer, sometimes referred to as a torque arm, one or more gear reduction stages are formed in a housing which may be supported on a machine surface, or which may be supported directly on an input or output shaft as an overhung load. To provide the range of gear reduction combinations and torque and speed ratings needed by systems design engineers, manufacturers typically offer a range of similar products through a product family, varying in each both the rating of the various components, the overall gear reduction ratio, the torque characteristics, mounting configurations, and so forth.

Gear reducers of the type described above may be configured as single or multiple-stage machines. In general, the overall gear reduction ratio of the machine is defined by the parameters of input pinions or gears, intermediate pinions and gears, and output gearing. In a single-stage reducer, the gear reduction ratio is defined by the configuration of the input pinion and output gear which intermesh with one another. In multiple-stage machines, the overall gear reduction is the product of the individual reduction ratios of the successive stages.

Gear reducers of the type described above require a number of components which are separately manufactured, machined, and finally assembled into the packaged product. In general, the various components include the pinions and gearing of the rotating assemblies, the shafts or hubs of the rotating assemblies, support bearings for holding the rotating assemblies in the support housing, the various support housing elements, and seal assemblies positioned between the rotating assemblies and the support housing where the shafts or hubs extend from the housing. Depending upon the gear reducer design, size and rating, the support housing may be one of the more complex and costly items. In particular, gear reducer housings are often made of sturdy castings, such as steel alloy castings, which must be machined to receive the rotating assemblies, bearings, and so forth. Moreover, the support housings must be machined in a number of steps, to define the various sealing surfaces, aligned support surfaces, and the features used to assemble the gear reducer and maintain a unified structure as defined by the housing itself.

Conventional gear reducer designs have generally not provided for significantly reduced or optimized manufacturing and assembly. For example, housings of gear reducers designed as shells to receive the rotating groups often begin as a casting which must be machined in a number of sequential manufacturing steps and fixtures. Flat sealing and locating surfaces are generally machined, such as in a milling or grinding operation, followed by refixturing of the housing blank for machining of bearing support surfaces, sealing surfaces for rotating assemblies, and so forth. In many instances, additional holes are bored for bolts or similar fasteners used to maintain the housing components in the assembled unit. The resulting machining operations can be quite extensive and costly, often representing one of the more substantial costs in the manufacturing of the product.

There is substantial need, therefore, for improved techniques for manufacturing and assembling gear reducers and similar products. There is a particular need for a technique which can reduce fixturing and machining costs and steps, by judiciously forming features of the gear reducer housing.

SUMMARY OF THE INVENTION

The present invention provides novel features of a gear reducer housing designed to respond to these needs. The features facilitate manufacturing of the housing sealing and support surfaces, as well as the final assembly of the housing components in the product. The features may be employed in any suitable gear reducer housing design, but are particularly well suited to housings in which a peripheral flange, partial or complete, extends around at least a portion of the housing shell. The invention is also particularly well suited to housings in which mating housing components have fastener sets which extend through such partial or complete flanges for assembly.

In a presently preferred configuration, the gear reducer housing includes a plurality of fixturing pads which support the housing during machining operations. The fixturing pads may be formed on the housing blank following casting, but are conveniently formed as reduced thickness regions of a flange during the casting process. Thus, with no further machining, the housing blank may be fixtured a single time by retaining the housing at the fixturing pads, and a series of machining processes may be performed on the blank without refixturing. Other features may similarly be formed in the blank, or may be machined in subsequent operations. For example, slotted apertures are formed, preferably during the casting of the housing blank, at mirror-image locations about a centerline of the housing blank. Similar slotted apertures are formed on a mating housing component. The housing components, following machining and assembly with the gear reducer rotating assemblies, may then be secured to one another via the slotted apertures, axis of which are transverse to one another, providing inherent tolerance in the location of fastener sets used to secure the components in the assembly. Other similar features may be formed in the housing to further facilitate machining and assembly.

BRIEF DESCRIPTION OF THE DRAWINGS

The foregoing and other advantages of the invention will become apparent upon reading the following detailed description and upon reference to the drawings in which:

FIG. 3A is an elevational view of another speed reducer, including a single gear reduction stage, and incorporating a housing configured in accordance with certain of the inventive techniques, FIG. 3B is a sectional view of the housing of FIG. 3A, taken along line 3B—3B;

FIG. 4 is an elevational view of a single half or shell of the gear reducer housing of the type shown in FIGS. 2A and 3A, illustrating features of the original casting and machined surfaces;

FIG. 5 is an elevational view of an opposite housing half or shell designed to mate with the housing shell of FIG. 4;

DETAILED DESCRIPTION OF SPECIFIC EMBODIMENTS

Figure 1:
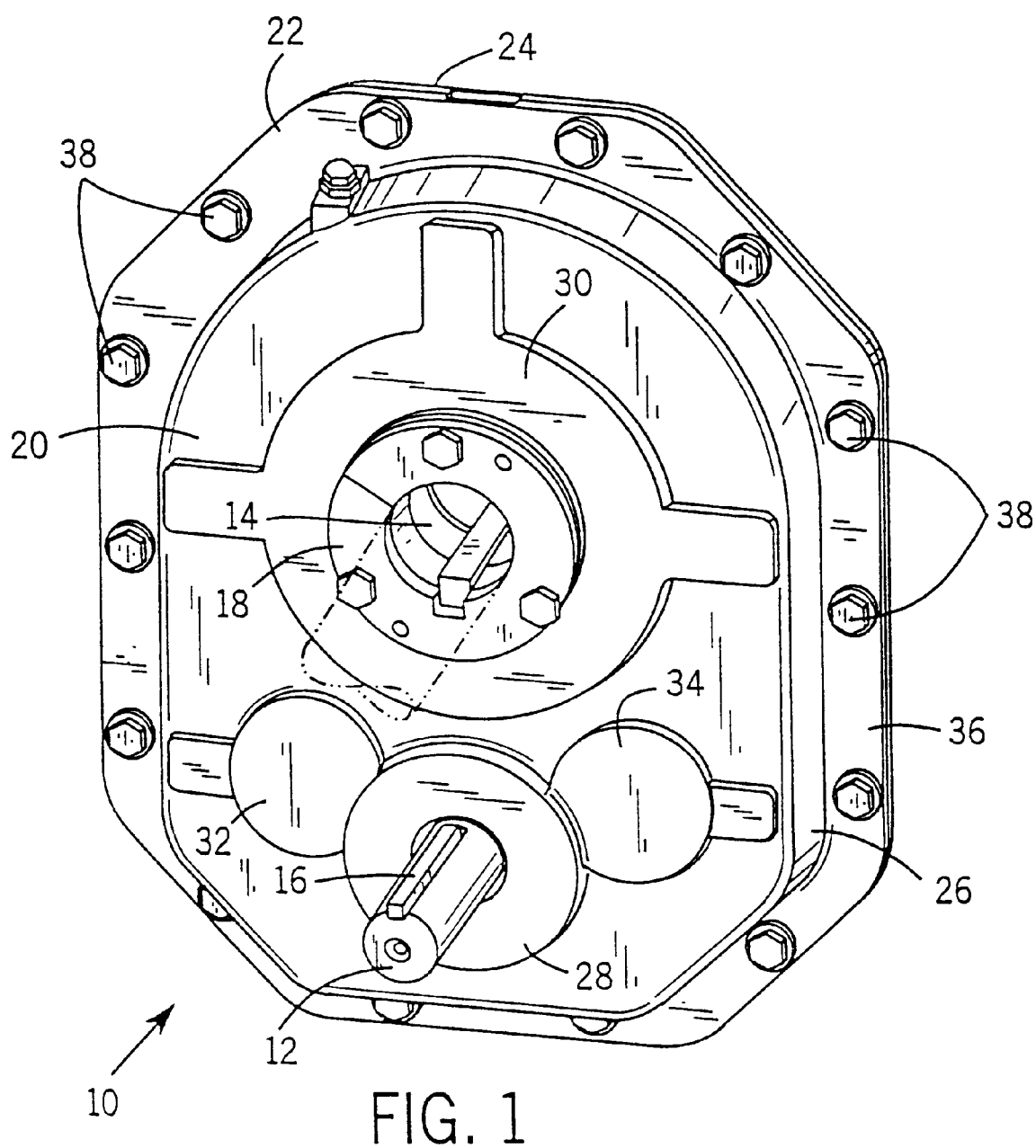
FIG. 1 is a perspective view of a speed reducer including a housing configured in accordance with certain aspects of the present technique.

Turning now to the drawings, and referring first to FIG. 1, a two-stage gear reducer, represented generally by the reference numeral 10, is illustrated as including an input shaft 12 which will be driven in a final application, and which will transmit mechanical power to an output hub 14 as described more fully below. It should be noted that while reference is made in the present description to input and output shafts and hubs, aspects of the present invention are not intended to be limited to any particular input or output configuration. In particular, input can be made into the gear reducer via an input hub configuration, or a shaft, with output from the gear reducer being made through a hub as illustrated, or via an output shaft. Similarly, while reference is made herein to a gear reducer, the machinery described herein may be employed for increasing speeds, where desired. In the illustrated embodiment, input shaft 12 is provided with a standard key 16 for transmitting torque, while output hub 14 is provided with a taper locking coupling system 18 and a key. Again, any suitable arrangements may be made for coupling the input and output components to other machinery, including keyed shafts and hubs, splined shafts and hubs, and so forth.

Gear reducer 10 includes a housing 20 for supporting at least the input and output rotating assemblies associated with shaft 12 and hub 14, as well as other rotating assemblies used to transmit torque between these components. As illustrated in FIG. 1, housing 20 includes a front housing half or shell 22, and a rear housing half or shell 24. As described in greater detail below, the housing shells are configured as identical structures, such that initial blanks or castings for the shells may be machined and assembled to form both the front and back shells. Each shell 22 and 24 of housing 20 includes an extending body portion 26 designed to enclose internal components of the gear reducer as described below.

Each shell 22 and 24 of housing 20 includes a series of support structures integrally formed therein for mechanically supporting rotating assemblies. These assemblies may include the input shaft 12, the output hub 14, as well as additional input or output assemblies, and intermediate rotating assemblies for transmitting torque in multiple stages. In the preferred embodiment illustrated, four support structures are provided on each housing shell, including an input support 28, and output support 30, a first offset support 32, and a second offset support 34. Again, the designations as input or output supports should not be interpreted as limiting the applicability of the various support locations. Input or output rotating structures may be provided at any one of the supports. The front and rear shells of housing 20 each are surrounded by a partial or, in the preferred embodiment illustrated, a complete peripheral flange 36 for facilitating assembly of the gear reducer. In particular, the shells are secured to one another with the rotating assemblies positioned therein, via a series of fastener sets 38 extending through the peripheral flanges. As noted below, the configuration of the gear reducer with the peripheral flange and fastener sets also facilitates mounting of the gear reducer. In particular, machine mounting flanges, support structures, and so forth (not shown) may include apertures which also receive certain of the fastener sets extending through the peripheral flanges of the gear reducer to support the gear reducer in given applications.

In the preferred embodiment illustrated, the gear reducer features enable the gear reducer to be configured in one of a number of ratings, depending upon the internal configuration of the gearing intermeshing to define the gear ratio. Moreover, the gear reducer housing is particularly well suited to both single-stage configurations as well as multiple-stage units, both based upon the same identical housing shell castings. As described below, in the illustrated embodiments, reference numeral 10 generally refers to an exemplary two-stage gear reducer, while reference numeral 11 (see, e.g., FIGS. 3A and 3B) refers to a single-stage gear reducer constructed of the same housing shells, or housing shells designed with the features described herein.

Figure 2A:
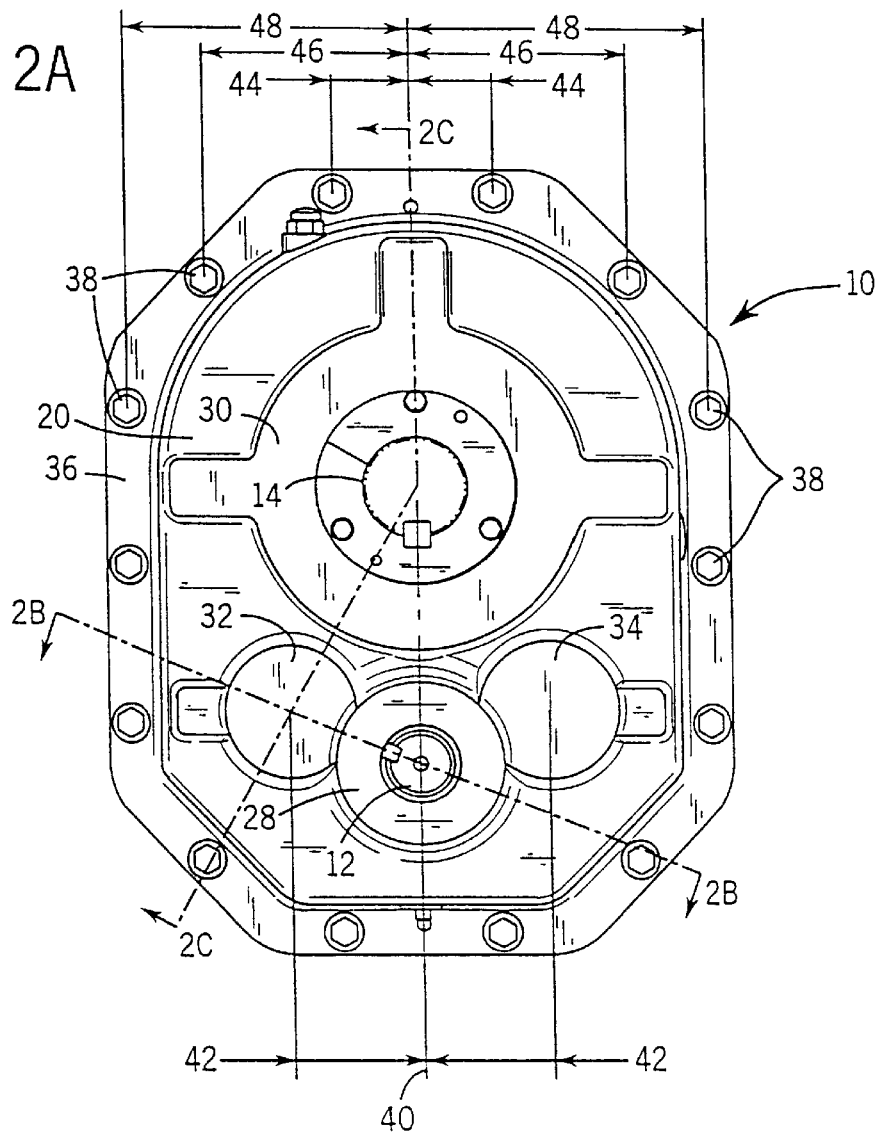
FIG. 2A is an elevational view of the speed reducer of FIG. 1, illustrating certain preferred features and geometries useful in configuring the housing shells or components.

To facilitate the use of components through a variety of gear reducer sizes and ratings, and to enable identical components to be used for front and back portions of the gear reducer, certain of the structural features of the housing and gear reducer are formed in mirror-image locations as best illustrated in FIG. 2A. As shown in FIG. 2A, the gear reducer housing 20 in which gear reducer 10 (or 11 as described below) is assembled, has a longitudinal centerline 40 about which the structural features are provided in mirror-image locations. The first and second rotating assembly supports 28 and 30 are provided on the longitudinal centerline 40. The third and fourth rotating assembly supports 32 and 34, offset from the centerline 40, are centered at identical distances from the centerline, as indicated by reference numerals 42 in FIG. 2A. As described below, this configuration enables supports on a front shell of the housing to correspond exactly to locations of mirror-image supports on the rear shell of the housing. That is, for the front shell illustrated in FIG. 2A, offset support 32 will overlie offset support 34 of the rear housing shell, with offset support 34 of the front housing shell overlying offset support 32 of the rear shell. The internal configuration of these features, and the manner in which they overlie one another will be described more fully below.

In addition to the mirror-image locations of the rotating assembly supports, housing 20 includes a series of locations for the fastener sets 38 which are also disposed in mirror-image locations about centerline 40. In particular, in the illustrated embodiment a series of fastener set locations are provided at distances 44, 46 and 48 identically offset from the centerline. Thus, when front and rear housing shells are mated with one another, fastener set locations on either side of the centerline will overlie one another.

Figure 2B:
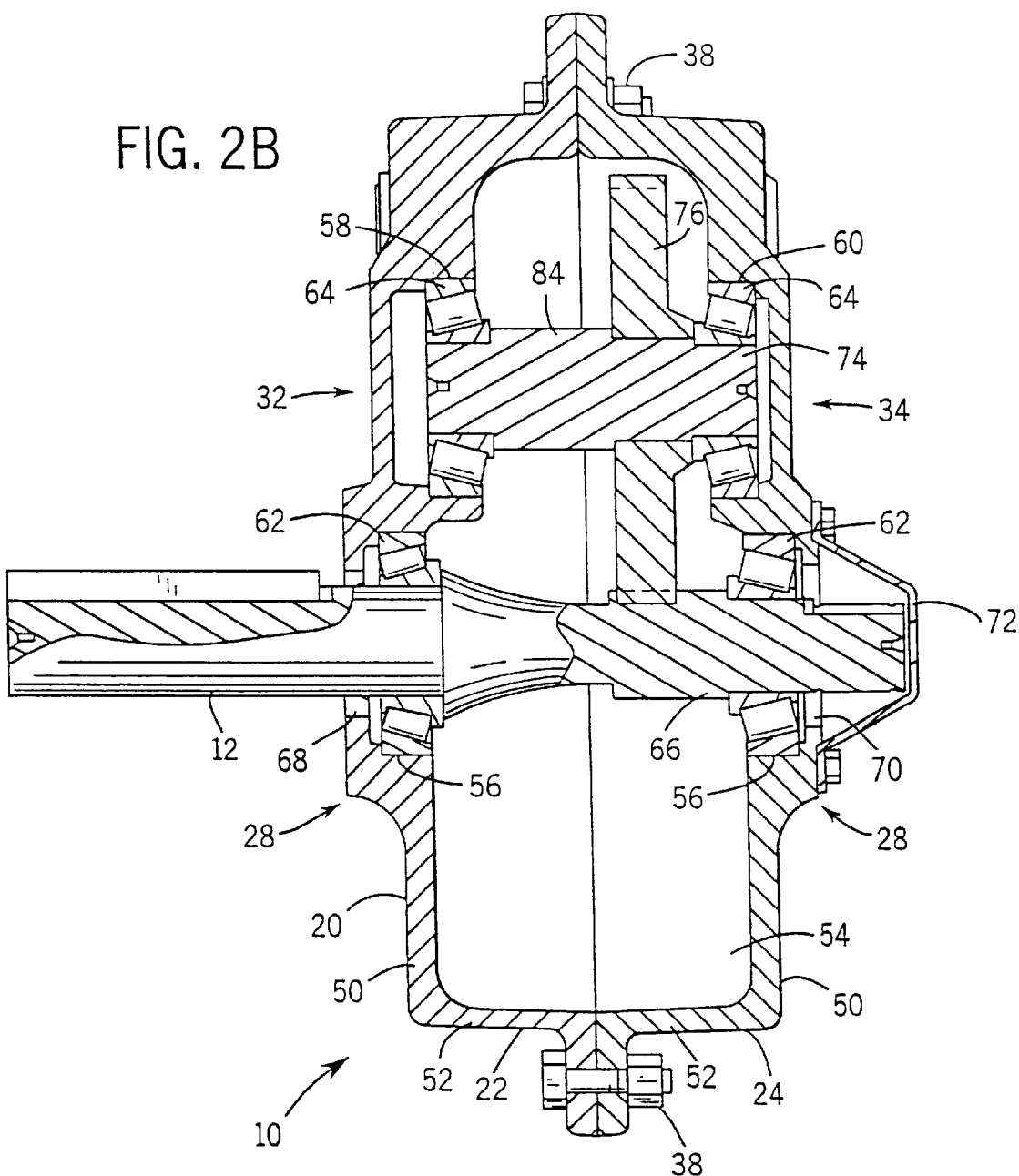
FIG. 2B is a sectional view of the gear reducer of FIG. 2A taken along line 2B—2B.
Figure 2C:
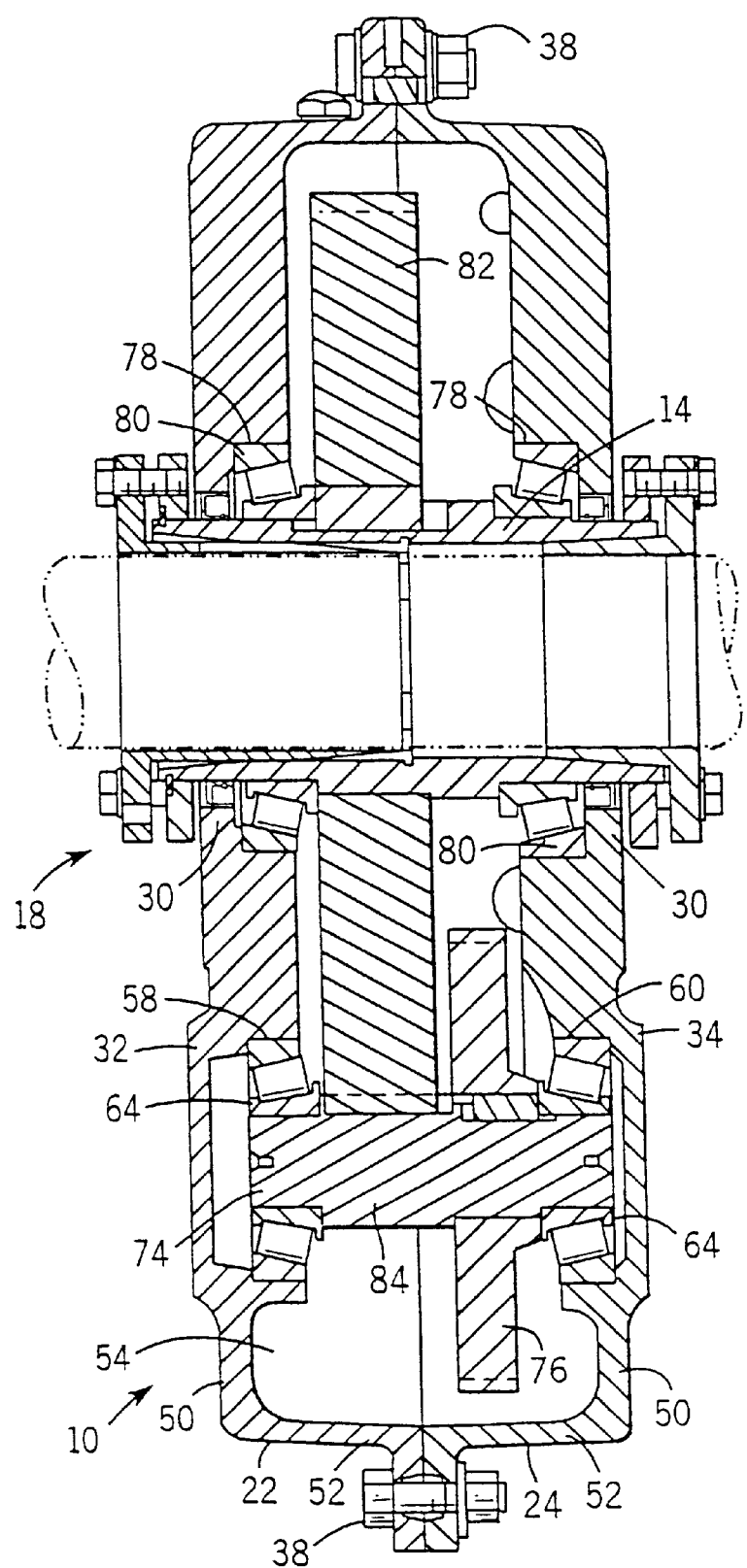
FIG. 2C is a sectional view of the gear reducer of FIG. 2A taken along line 2C—2C.

Referring now more particularly to the internal configuration of the gear reducer illustrated in FIG. 2A, FIGS. 2B and 2C depict two different torque-transfer paths through the rotating assemblies supported at the support locations described above. FIG. 2B illustrates shaft 12 extending through front housing shell 22 and rear housing shell 24 in a presently preferred arrangement. As shown in FIG. 2B, front housing shell 22 and rear housing shell 24 are identical structures, each including a generally planar wall 50 formed integrally with a peripheral wall 52. Walls 50 and 52 of each housing shell, when assembled in the product, enclose an internal cavity 54 in which the gearing, bearings, and other components of the gear reducer are positioned.

At each rotating assembly support location, the housing shells are provided with support structures which can be machined to receive a support bearing assembly for the rotating assembly. In particular, as shown in FIG. 2B, supports 28, receiving shaft 12, and supporting the shaft in rotation, each include a bearing support 56 machined within enlarged regions or ribs integrally formed in the casting or blank from which the housing shells are machined. Similar bearing supports 58 and 60 are formed in front housing shell 22 and rear housing shell 24, respectively, to support an intermediate rotating assembly. Again, due to the mirror-image and identical structures of the front and rear housing shell castings, when assembled in the gear reducer as shown in FIG. 2B, support 32 of the front housing shell 22 overlies support 34 of the rear housing shell 24. Within bearing supports 56, bearing assemblies 62 are provided for supporting shaft 12 in rotation. Similarly, bearing sets 64 are provided in bearing supports 58 and 60 of the front housing shell 22 and the rear housing shell 24, respectively.

Each rotating assembly of the gear reducer, supported at a corresponding support location, will generally include a rotating support member, such as a shaft or hub, and gearing, such as a pinion or gear wheel affixed to the shaft or hub. In the embodiment illustrated in FIG. 2B, input shaft 12 includes a pinion 66 which is formed integrally with the shaft. Alternatively, gearing or a pinion may be affixed to the shaft in a subsequent operation. Shaft 12 extends through apertures 68 and 70 formed through front housing shell 22 and rear housing shell 24, respectively. At each location where the shaft extends through the shell, seal assemblies (not shown in FIG. 2B) may be provided for retaining lubricant within the gear reducer housing and preventing the ingress of contaminants and fluids from outside the housing. A blind end of shaft 12, extending through aperture 70 and rear housing shell 24 is covered by a sealed cover assembly 72. An intermediate rotating assembly consisting of a shaft 74 and gear 76 are supported by bearings 64. The gear 76 of the intermediate rotating assembly meshes with pinion 66 of shaft 12 to provide an initial or first stage gear reduction. These components are again illustrated in FIG. 2C, along with the rotating assembly associated with hub 14.

Referring to FIG. 2C, bearing supports 78 are formed at the location of output support 30 of both front and rear housing shells 22 and 24. Again, by virtue of the mirror-image configuration of the gear reducer housing, and the use of identical front and rear shell castings, the locations of these supports overlie one another in the assembled product. Bearing sets 80 are supported within bearing supports 78, and, in turn, support hub 14 in rotation. An output gear 82 is secured to hub 14 and rotates therewith, intermeshing with a pinion section 84 of shaft 74. Pinion section 84, in the illustrated embodiment, is formed integrally with shaft 74 adjacent to the location of gear 76 in the assembled product.

In the case of the multi-stage gear reducer 10, the structure described above provides integral support locations for the input, output, and intermediate rotating assemblies in locations which overlie one another. It should be noted, that not all of the integral supports formed with the housing shells need be machined to receive bearing sets or rotating assemblies. In particular, in the multi-stage gear reducer 10 shown in FIGS. 2A, 2B and 2C, the offset support 32 of the front shell half is machined to receive a bearing set, as is the offset support 34 of the rear shell. However, the offset support 34 of the front shell, and the offset support 32 of the rear shell need not be machined if no rotating assembly is to be supported therein. It should also be noted, that while identically sized and rated bearing sets may be provided on either side of each rotating assembly, depending upon anticipated loading, bearing sets of different sizes or ratings may be provided. In particular, as shown in FIG. 2B, bearing sets 62 on either side of input shaft 12 have different sizes and ratings in view of the anticipated loading of the shaft. Similarly, the bearing supports formed in each support structure may be machined to different dimensions (e.g., diameters and depths) to accommodate the bearing set to be supported therein.

FIGS. 3A and 3B illustrate a single-stage gear reducer 11 configured in accordance with the foregoing techniques, but including only a pair of rotating assemblies intermeshing with one another. In particular, housing 20 of single-stage gear reducer 11 may be configured identically to the housing illustrated in the foregoing figures and described above, with mirror-image rotating assembly supports, fastener set locations, and so forth about a centerline as shown in FIG. 2A. However, where a single gear reduction is needed, only certain of the locations need be machined and assembled to support rotating shafts or hubs and their associated gearing. In the embodiment illustrated in FIGS. 3A and 3B, an input shaft 86 is supported by supports 28 of front and rear housing shells 22 and 24, while an output hub 14 is supported at support 30 of both housing shells. Input shaft 86 which may be generally similar to input shaft 12 described above, or differently configured depending upon the intended application and ratings, will typically include a pinion section 88 designed to intermesh with an output gear 90 supported on hub 14. Other supports and components of the assemblies may be substantially identical to those described above. Because no rotating assemblies are provided for gear reductions between the input and output rotating assemblies, integral structures provided at supports 32 and 34 of both the front and rear housing shells need not be machined to receive support bearings.

As summarized above, the gear reducers constructed in accordance with the present techniques facilitate assembly and support of various rotating assemblies, and configuration of a wide variety of gear reducer types and ratings by virtue of features of the gear reducer housing and its associated components. FIGS. 4 and 5 illustrate identical blanks for the front and rear housing shells 22 and 24, respectively, showing certain of these features. As noted above, each housing shell includes a peripheral flange 36 in which fastener sets are received to secure the housing shells to one another. Within each housing shell, rotating assembly supports 28, 30, 32 and 34 are integrally formed. While any suitable material and process may be used to form the shells incorporating the useful features herein, presently preferred materials and techniques include metal alloys, such as iron or steel alloys cast to integrally form certain of the features, and subsequently machined to refine those features needed in the assembled product.

Among the features machined in the housing shells, peripheral flange 36 preferably includes a smooth, flat sealing surface 92 formed by a milling operation on the housing shell blank. Apertures 94 and 96 formed through the flange may be conveniently cast, or may be machined in a subsequent operation. However, in the preferred embodiment illustrated, the apertures are elongated, with certain of the apertures being elongated in a generally horizontal direction as indicated at reference numeral 94, and other apertures being elongated in a generally horizontal direction as indicated at reference numeral 96. As described more fully below, with reference to FIG. 6, the elongated apertures facilitate assembly and alignment of the mirror-image housing shells. In addition to apertures 94 and 96, peripheral flange 36 preferably includes a series of machine fixturing recesses 98, three such recesses being cast into the illustrated housing shell in the preferred embodiment.

As will be appreciated by those skilled in the art, typical machining procedures for complex castings such as those employed in gear reducer housings, often require a series of machining fixtures, each designed to appropriately support and orient the casting in general purpose or specifically designed machine tools. The fixtures themselves, and the fixturing operations, can lead to substantial costs in the manufacturing process. The provision of fixturing recesses 98 has been found to greatly reduce the need to refixture the housing shells for machining of the various features required for supporting the rotating assemblies and for maintaining a sealed and lubricated interior space in the product. In particular, peripheral flange 36 is preferably cast with a desired thickness, with fixturing recesses 98 being of a reduced thickness. Moreover, fixturing recesses 98 are preferably of a thickness F smaller than the final thickness of flange 36 following machining of the seal surface 92. Thus, the housing shells may be secured by clamps (not shown) in a machine fixture at the locations of fixturing recesses 98, and subsequent machining operations, including the formation of seal surface 92, may be carried out through the use of conventional machine tools without removing the shell blank from the support fixture. Where designed, the support fixture may be configured for rotation about one or more axis to facilitate access to and machining of the various bearing supports, seal surfaces, threaded lubricant supports, and so forth as may be designed into the final product.

The rotating assembly supports integrally formed into the housing shell blanks are machined in accordance with the needs of the final product configuration. In particular, as shown in FIGS. 4 and 5, where an input shaft is to be supported at supports 28, bearing supports 56 will typically be machined to receive bearing sets as described above. An aperture 68 or 70 may also be machined at the first support location as described above. Similarly, a bearing support 78 is machined to support the output rotating assembly at support 30, with additional surfaces being machined, as desired, to support seal assemblies and so forth. At offset supports 32 and 34, additional bearing support surfaces 58 and 60 are machined to support an intermediate rotating assembly. It should be noted that in the illustrated embodiment bearing support 60 in front housing shell 22 is not machined and that bearing support 58 in rear housing shell 24 is not machined. Again, it should be noted that, although the housing shell blanks are identical prior to machining, the functional designations of the support locations are identified in FIGS. 4 and 5, such that offset support 32 of front housing shell 22 will overlie offset support 34 of rear housing shell 24 when housing shell is positioned thereon, with offset support 34 of front housing shell 22 overlying offset support 32 of rear housing shell 24.

Figure 6:
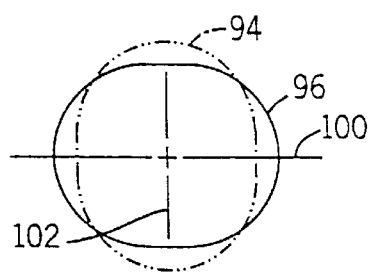
FIG. 6 is a detailed representation of a preferred technique for forming apertures for fasteners used to secure the housing shells to one another in a position-tolerant manner.

As noted above, the apertures formed in the peripheral flange of the gear reducer housing are preferably configured to permit tolerance in the alignment of the fastener apertures during assembly. In particular, where the apertures are cast in the blank for the gear reducer housing shells, such tolerance may be useful in permitting some degree of drift of the actual fastener position. FIG. 6 illustrates the general configuration of these apertures in the preferred embodiment. In particular, each generally horizontally disposed aperture 96 has a major axis 100 and a minor axis 102. The aperture is extended along axis 100 such that its dimension along this axis is greater than its dimension along axis 102. Conversely, generally vertically disposed apertures 94 have a dimension extended along axis 102 with respect to their dimensions along axis 100. Thus, when the housing shells are secured to one another for product assembly, some degree of tolerance or drift of the actual point of crossing of the apertures is permitted, while maintaining the desired fastener clearance as defined by the smaller of the axial dimensions of apertures 94 and 96 (the dimension of aperture 96 along axis 102 and the dimension of aperture 94 along axis 100). It should be noted that the apertures need not be oriented along axes which are aligned with or orthogonal to centerline 40 of the gear reducer housing as in the illustrated embodiment. Rather, in general, the axes may be rotated from the orientation illustrated and permit some degree of tolerance in the location of the fasteners as described. Moreover, major and minor axes for each aperture may be angularly oriented with one another by angles other than 90 degrees and still permit some degree of fastener location tolerance.

Figure 7:
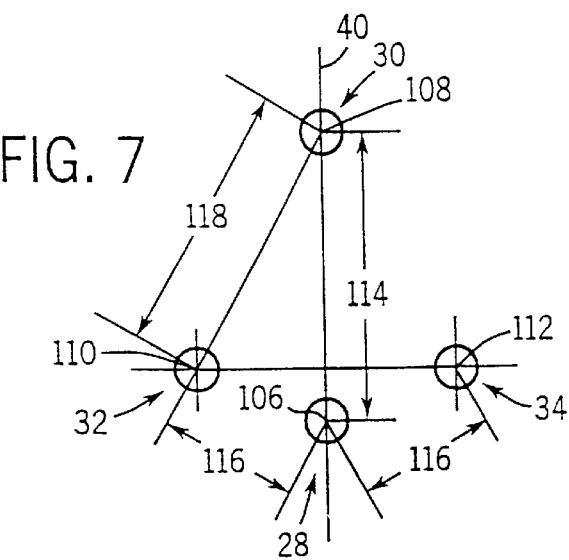
FIG. 7 is a diagrammatical representation of a preferred lay out for rotating assembly or shaft positions in the housing designed to permit additional flexibility in the use of the housing for different gear reduction ratios and different numbers of gear reduction stages.

As noted above, the preferred embodiment of the gear reducer and gear reducer housing described above includes supports for rotational assemblies positioned at mirror-image locations. FIG. 7 illustrates diagrammatically an exemplary and preferred lay out for the rotational axes in the embodiments described above. As shown in FIG. 7, first and second of the rotational assembly supports, designated by reference numerals 28 and 30, lie along a centerline 40 of the gear reducer and gear reducer housing. Additional third and fourth rotating assembly supports 32 and 34 are provided at mirror-image offset locations from the centerline 40. In the diagrammatical representation of FIG. 7, the supports for the rotating assemblies are provided at locations 106 and 108 along the centerline 40, and at the offset locations 110 and 112 on either side of the centerline. Moreover, locations 106 and 108 are spaced from one another by a distance DA, represented by reference numeral 114 in FIG. 7. Location 106 is also spaced from locations 110 and 112 by a distance DB, as denoted by reference numeral 116 in FIG. 7. Finally, location 110 is spaced from location 108 by a distance DC, as indicated by reference numeral 118 in FIG. 7 (location 112 being similarly spaced from location 108).

The symmetrical disposition of the axis locations for the rotating assemblies in the present technique permit considerable design flexibility and interchangeabilty of parts in the product and in families of products. In particular, in the foregoing arrangements, distance DA (114 in FIG. 7) is selected to accommodate the appropriate center distance for single-stage gear reducers such as gear reducer 11 described above. Distances DB and DC (116 and 118 in FIG. 7) are then selected to accommodate various configurations for first and second stages of two-stage gear reducers. The symmetrical disposition of locations 110 and 112 allow for the use of identical components on front and rear sections of the final product, and particularly of housing shell blanks which are machined at appropriate locations to receive rotating assembly support bearings.

It should be noted that the axis layout of FIG. 7 may be modified or utilized in various way to obtain similar advantages throughout various product configurations. For example, while in the presently preferred embodiment an input rotating assembly is positioned at location 106, with an output rotating assembly positioned at location 108, one or both of these locations could be used for input or output, or input and output rotating assemblies could be positioned at either of locations 110 or 112. Moreover, the particular spacing selected between the rotating assembly axis locations will vary depending upon the gearing selected, the torque and power ratings of the gear reducers, the number of different combinations of gearing within the gear reducers, and the need to utilize similar or identical components between single and multiple-stage gear reducers.

Figure 8:
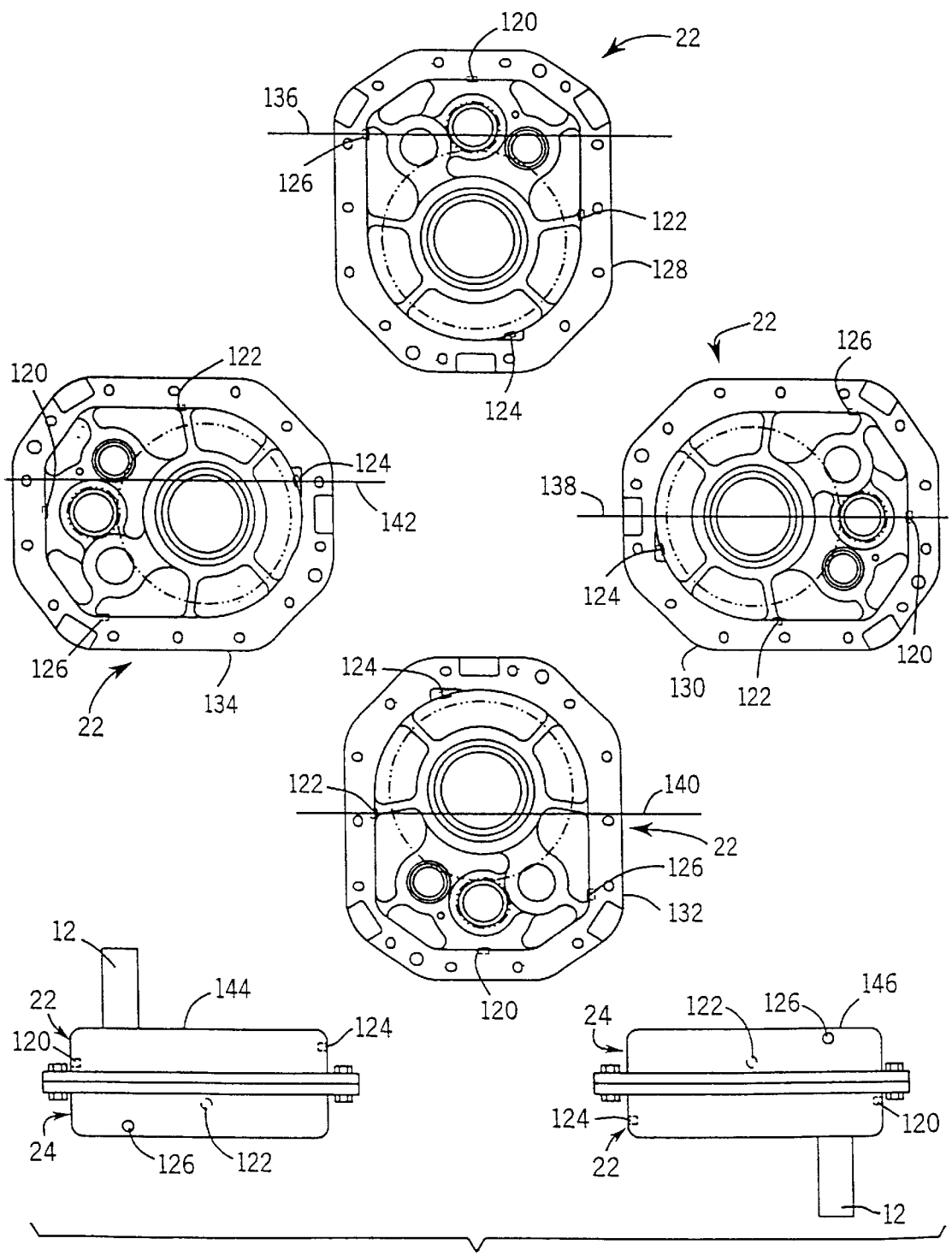
FIG. 8 is a series of elevational views of gear reducers including housings designed in accordance with the present technique, and showing various orientations permissible by virtue of the positioning of lubricant fill, drain, and level apertures in the housing.

The use of a modular housing and assembly approach to the gear reducers described above offers additional advantages as indicated in FIG. 8. In particular, the housings may be mounted in one of several different orientations based upon the particular application and the machine support provided in the application. In a presently preferred configuration, at least one of the housing shells is provided with a series of ports or threaded apertures for receiving lubricant, draining lubricant, and controlling lubricant level. As shown in FIG. 8, four such apertures are, provided in the illustrated embodiment, including apertures 120, 122, 124 and 126. FIG. 8 illustrates a series of four different exemplary positions in which the gear reducer may be oriented, with the apertures serving different purposes in each position. The locations of the apertures are preferably selected to accommodate these different functions.

The positions illustrated in FIG. 8 include a first position 128, a second position 130, a third position 132, and a fourth position 134 (moving from the uppermost image in a clockwise direction in FIG. 8). In each position, one of the apertures serves as a fluid fill port in which a lubricating oil may be poured to provide lubrication of the rotating assemblies. An additional port serves as a fluid level control port. A third port serves in each position as a fluid drain port. In the embodiments illustrated in FIG. 8, each port is provided along a desired fluid level as defined by the particular locations of the rotating assembly supports. The function of the ports then depends upon the particular orientation of the gear reducer adopted in the application.

In the specific embodiment illustrated in FIG. 8, a first fluid level 136 is defined in orientation 128, with port 126 being located at that level. Port 120 then serves as a fluid fill port and port 124 serves as a drain port. In orientation 130, a desired lubricant level 138 is defined, and port 120 is positioned at that level. Port 122 then serves as a drain port, with port 126 serving as a fill port. In orientation 132, a desired lubricant level 140 is defined, with port 122 being located at that level, port 120 serving as a drain port, and port 124 serving as a fill port. Finally, in orientation 134, a desired lubricant level 142 is defined, with port 124 being provided at that level, port 122 serving as a fill port, and port 126 serving as a drain port. It should also be noted that ports 120, 122, 124 and 126 do not have to be on one housing shell 22 as shown. For example, ports 122 and 126 could be moved to shell 24 with the same function being provided. In this case, the ports could be moved axially along the gear case and serve as fill, drain and level holes when the reducer is mounted with the shaft axes vertical and the input shaft extending either up or down as in positions indicated by reference numerals 144 and 146 in FIG. 8, respectively. In this orientation with the input shaft extending up, port 124 is the fill port, port 126 is the drain port and port 120 is the level port. In orientation input shaft extending down, port 126 is the fill port, port 124 is the drain port and port 122 is the level port.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for manufacturing a gear reducer housing, the method comprising:
   forming a first portion of a gear reducer housing;
   fixturing the first portion via a plurality of fixturing pads adjacent to a sealing surface of the first portion and machining a first feature on the first portion; and
   machining a second feature on the first portion without refixturing.

2. The method of claim 1, wherein the plurality of fixturing pads are of a reduced thickness relative to adjacent regions of the sealing surface.

3. The method of claim 1, wherein the plurality of fixturing pads are configured to allow rotation about one or more axes of the first portion.

4. The method of claim 1, wherein one of the first feature and second feature comprises a smooth flat sealing surface extending around a section of a perimeter of the first portion of the gear reducer housing.

5. The method of claim 4, wherein the other of the first feature and the second feature comprises a rotating assembly support.

6. The method of claim 4, wherein the section of the perimeter comprises the entire perimeter.

7. The method of claim 4, wherein the first portion includes a plurality of apertures formed through the sealing surface, the apertures including a first set and a second set, and wherein the first set and the second set are on opposite sides of an axis which divides the first half into mirror images, the first set and second set forming mirror image layouts of each other on opposite sides of the axis.

8. The method of claim 7, wherein the plurality of apertures comprise elongated holes and wherein individual corresponding apertures of the first set and the second set are elongated in different directions.

9. The method of claim 1, comprising machining a third feature on the first portion without refixturing the first portion.

10. The method of claim 1, wherein one of the first feature and second feature comprises a support for a rotating assembly.

11. The method of claim 1, wherein the step of forming the first portion of a gear reducer housing comprises casting a plurality of apertures through a peripheral flange of the first portion.

12. The method of claim 11, wherein the plurality of apertures comprises a first set and a second set, and wherein the first set and the second set are cast on opposite sides of an axis which divides the first half into mirror images, the first set and second set forming mirror image layouts of each other on opposite sides of the axis.

13. The method of claim 12, wherein the plurality of apertures comprise elongated holes and wherein individual corresponding apertures of the first set and the second set are elongated in different directions.

14. A method for manufacturing a gear reducer housing comprising:

casting a half of a gear reducer housing;

fixturing the half via a plurality of fixturing pads adjacent to a sealing surface of the half;

machining a sealing surface around at least a portion of a perimeter of the half without refixturing the half; and machining a support for at least one rotating assembly without refixturing the half.

15. The method of claim 14, wherein the plurality of fixturing pads are of a reduced thickness relative to the sealing surface.

16. The method of claim 14, wherein the plurality of fixturing pads are configured to allow rotation about one or more axes of the half.

17. The method of claim 14, wherein the portion of the perimeter comprises the entire perimeter.

18. The method of claim 14, further comprising machining a second support for a further rotating assembly without refixturing the half.

19. The method of claim 14, wherein the half includes a plurality of apertures formed through the sealing surface, the apertures including a first set and a second set, and wherein the first set and the second set are formed on opposite sides of an axis which divides the half into mirror images, the first set and second set forming mirror image layouts of each other on opposite sides of the axis.

20. The method of claim 19, wherein the plurality of apertures comprise elongated holes and wherein individual corresponding apertures of the first set and the second set are elongated in different directions.

21. The method of claim 14, wherein the step of casting a half of a gear reducer housing comprises casting a plurality of apertures through the sealing surface.

22. The method of claim 21, wherein the plurality of apertures comprises a first set and a second set, and wherein the first set and the second set are cast on opposite sides of an axis which divides the half into mirror images, the first set and second set forming mirror image layouts of each other on opposite sides of the axis.

23. The method of claim 22, wherein the plurality of apertures comprise elongated holes and wherein individual corresponding apertures of the first set and the second set are elongated in different directions.

24. A method for manufacturing a gear reducer comprising:

casting a first half and a second half of a gear reducer housing;

fixturing the first half via a plurality of fixturing pads adjacent to a respective sealing surface thereof;

machining a first feature on the first half; and machining a second feature on the first half without refixturing the first half.

25. The method of claim 24, further comprising:

fixturing the second half via a plurality of fixturing pads adjacent to a respective sealing surface thereof;

machining a third feature on the second half; and machining a fourth feature on the second half without refixturing the second half.

26. The method of claim 25, further comprising mounting a plurality of rotating assemblies in the first half and in the second half.

27. The method of claim 26, further comprising joining the first half to the second half.

28. The method of claim 24, wherein the pluralities of fixturing pads are of a reduced thickness relative to the sealing surfaces.

29. The method of claim 24, wherein the plurality of fixturing pads adjacent to a sealing surface of the first half are configured to allow rotation about one or more axes of the first half and wherein the plurality of fixturing pads adjacent to a sealing surface of the second half are configured to allow rotation about one or more axes of the second half.

30. The method of claim 25, further comprising forming a plurality of apertures through a sealing surface of the first half and through a sealing surface of the second half.

31. The method of claim 30, wherein the plurality of apertures comprises a first set and a second set, and wherein the first set and the second set are formed on opposite sides of an axis which divides the first half and the second half each into mirror images, the first set and second set forming mirror image layouts of each other on opposite sides of the axis.

32. The method of claim 31, wherein the plurality of apertures comprise elongated holes and wherein individual corresponding apertures of the first set and the second set are elongated in different directions.

33. The method of claim 25, wherein the step of casting the first half of a gear reducer housing comprises casting a plurality of apertures through a sealing surface of the first half and wherein the step of casting the second half of a gear reducer housing comprises casting a plurality of apertures through a sealing surface of the second half.

34. The method of claim 33, wherein the plurality of apertures comprises a first set and a second set, and wherein the first set and the second set are cast on opposite sides of an axis which divides the first half and the second half each into mirror images, the first set and second set forming mirror image layouts of each other on opposite sides of the axis.

35. The method of claim 34, wherein the plurality of apertures comprise elongated holes and wherein individual corresponding apertures of the first set and the second set are elongated in different directions.

36. The method of claim 24, wherein the first feature comprises a sealing surface around a portion of a perimeter of the first half.

37. The method of claim 36, wherein the portion of a perimeter comprises the entire perimeter of the first half.

* * * * *

UNITED STATES PATENT AND TRADEMARK OFFICE
CERTIFICATE OF CORRECTION

PATENT NO.     : 6,530,138 B2
DATED          : March 11, 2003
INVENTOR(S)    : Allyn E. Phillips It is certified that error appears in the above-identified patent and that said Letters Patent is hereby corrected as shown below:

<u>Title page,</u>
Item [75], Inventor should read -- Allyn E. Phillips, Salem, SC; Patrick S. Clare, Greenville, SC --.

Signed and Sealed this

Sixteenth Day of September, 2003

JAMES E. ROGAN
*Director of the United States Patent and Trademark Office*